(12) United States Patent
Rex et al.

(10) Patent No.: US 8,597,008 B1
(45) Date of Patent: Dec. 3, 2013

(54) METHOD AND APPARATUS FOR CONTROLLING THE SIDEWALL VS. TREAD CURING TEMPERATURE IN A TIRE MOLD

(71) Applicant: The Goodyear Tire & Rubber Company, Akron, OH (US)

(72) Inventors: William Allen Rex, Doylestown, OH (US); Todd Andrew Bachochin, North Jackson, OH (US); Dale Eugene Wells, Massillon, OH (US); William Andrew Haydu, Jr., Copley, OH (US); Daniel Dale Enix, Ravenna, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 13/661,189

(22) Filed: Oct. 26, 2012

(51) Int. Cl.
*B29C 33/02* (2006.01)

(52) U.S. Cl.
USPC .............. 425/28.1; 249/111; 425/35; 425/40; 425/46

(58) Field of Classification Search
USPC ................. 425/28.1, 35, 40, 46; 249/111
See application file for complete search history.

(56) References Cited

U.S. PATENT DOCUMENTS

| 4,568,259 | A | * | 2/1986 | Mattson | 425/28.1 |
| 5,769,975 | A | * | 6/1998 | Keys | 425/28.1 |
| 6,916,164 | B2 | * | 7/2005 | Kasper et al. | 425/46 |

\* cited by examiner

*Primary Examiner* — James Mackey
(74) *Attorney, Agent, or Firm* — June E. Rickey

(57) ABSTRACT

The present invention relates to an apparatus for providing the upper and lower portions of two-part tire molds with an expansible opening to provide clearance for the insertion of green tires, in particular large green tires of the sort used on industrial or off-road vehicles. The tire mold according to the present invention provides a segmented tire mold wherein a plurality of circumferentially arranged segments which contribute to the shaping of the circumferential tread portion of a tire. The sidewall rings and the tread segments may include internal cavities which house insulating material.

8 Claims, 3 Drawing Sheets

METHOD AND APPARATUS FOR CONTROLLING THE SIDEWALL VS. TREAD CURING TEMPERATURE IN A TIRE MOLD

TECHNICAL FIELD

This invention relates in general to tire molds, and more particularly to tire molds for large heavy duty tires.

BACKGROUND OF THE INVENTION

The manufacturing of pneumatic tires for motor vehicles of nearly all sizes entails the steps of creating the carcass and attaching thereto the tread and sidewalls, which are made of uncured rubber. The combination of carcass, tread and sidewalls, prior to curing of the rubber, is called a 'green tire.' The final step in the manufacture of a tire is the insertion of the green tire into a tire mold, wherein the tire is heated to a sufficiently high temperature to vulcanize the tire. The tire is then removed from the mold and the manufacturing process is complete.

Whereas the manufacturing of tires for automobiles is a straightforward process involving relatively light-weight green tires, the manufacture of large tires for industrial or large off-road type vehicles of the sort used in earth moving and construction work entails the handling of very large green tires weighing hundreds of pounds. Because the tread of these large tires are very thick and massive, it requires a lot of heat transfer to the tread area of the tire in order to properly cure the tread. The sidewalls of the tire are much thinner and thus require less heat as compared to the thick tread. One problem that may arise is that the sidewall of the tire is cured the desired amount, while the tread is under cured. Alternatively, the tread may be cured the desired amount, while the sidewall and belt edges may be overcured. Thus it is desired to have an improved tire mold which allows for the correct temperature of the tread and sidewall zone of a tire mold.

BRIEF DESCRIPTIONS OF THE FIGURES

The structure, operation, and advantages of the present preferred embodiment of the invention will become further apparent upon consideration of the following description taken in conjunction with the accompanying FIGURES, wherein.

DEFINITIONS

Figure 1:
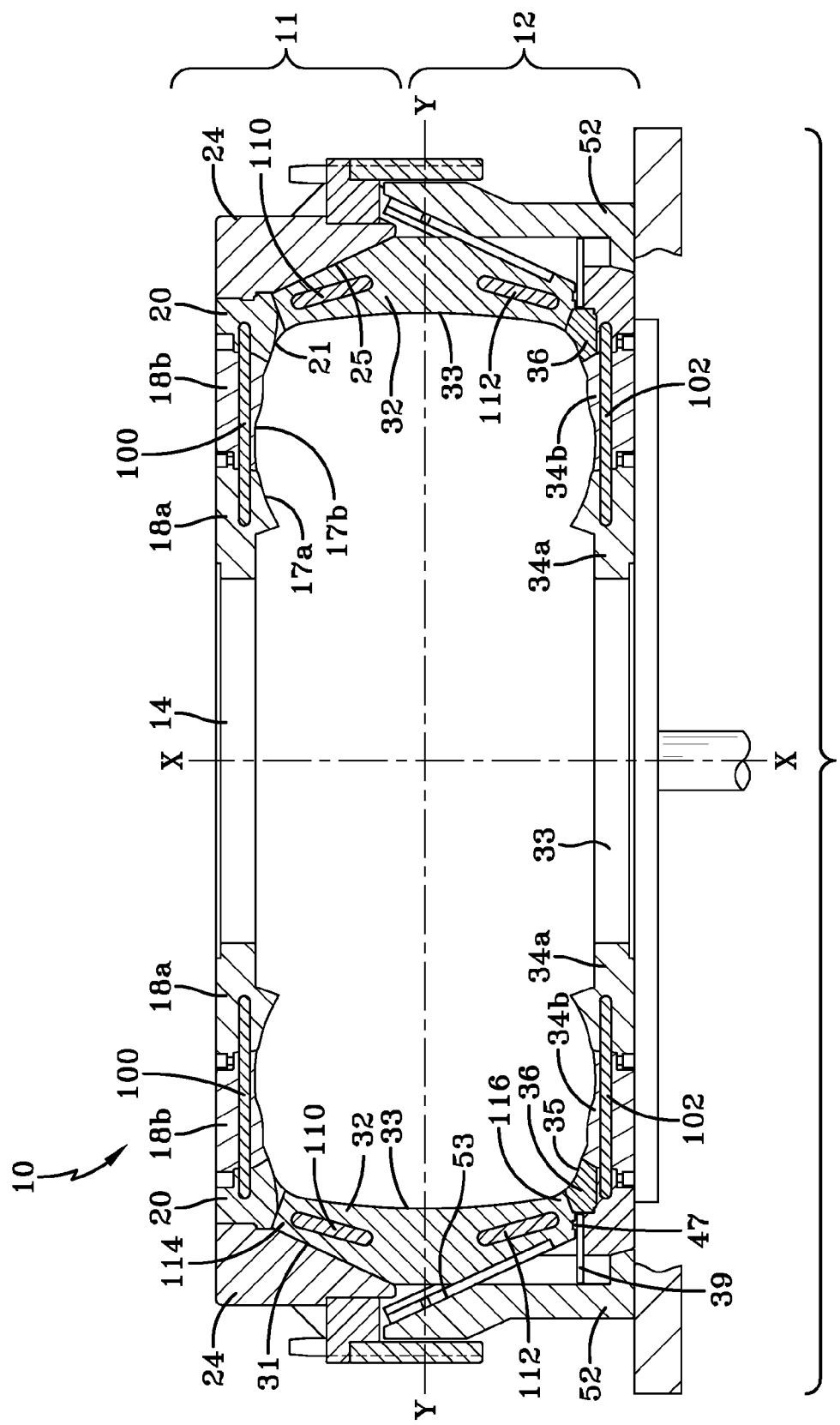
FIG. 1 is a cross-sectional side view of a tire mold of the present invention shown in the closed position.

"Axial" refers to the direction X-X shown in FIG. 1.
"Radial" refers to the direction Y-Y shown in FIG. 1.

DETAILED DESCRIPTION OF THE INVENTION

Figure 2:
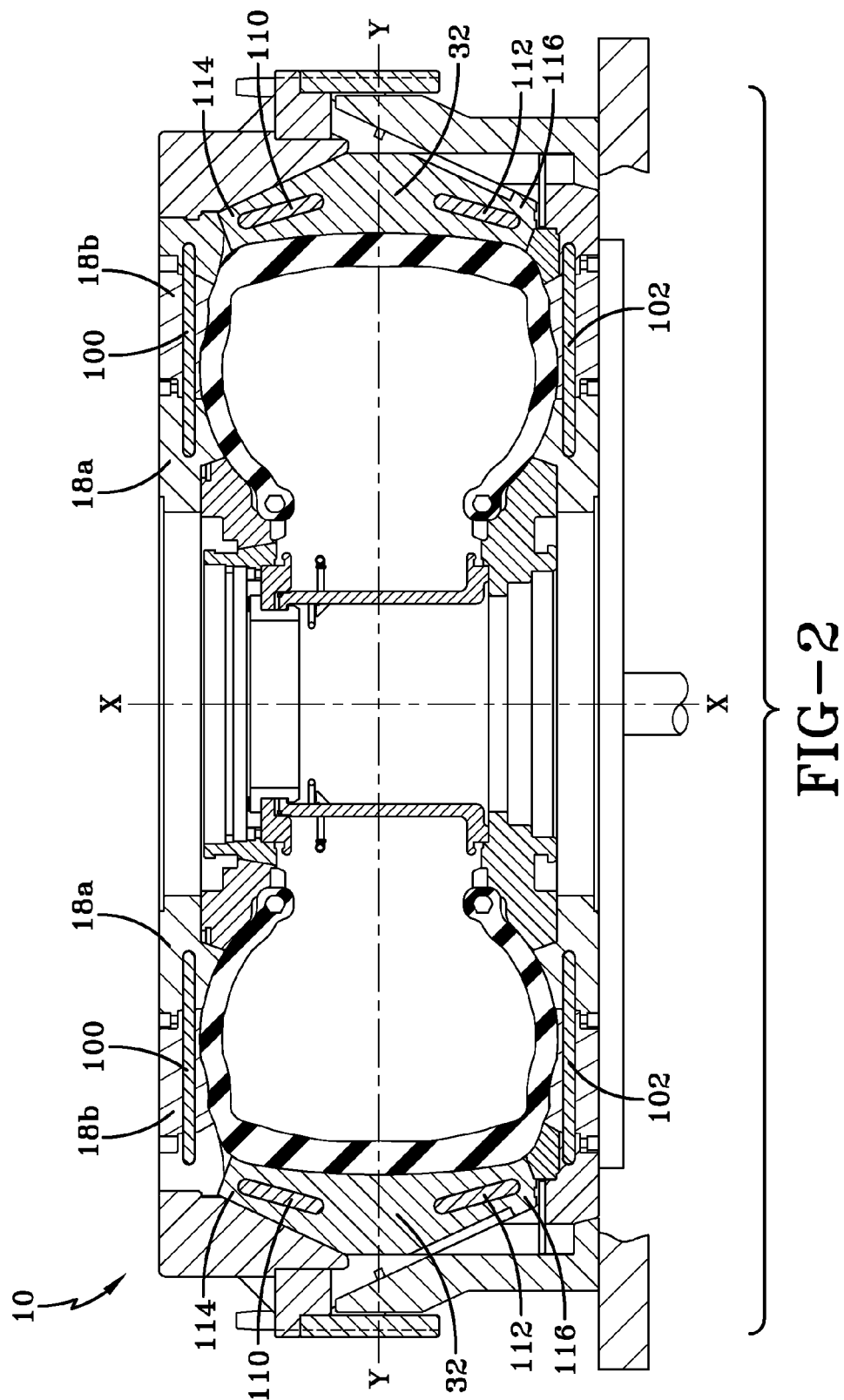
FIG. 2 is a cross-sectional side view of the tire mold of FIG. 1 shown with a tire therein.
Figure 3:
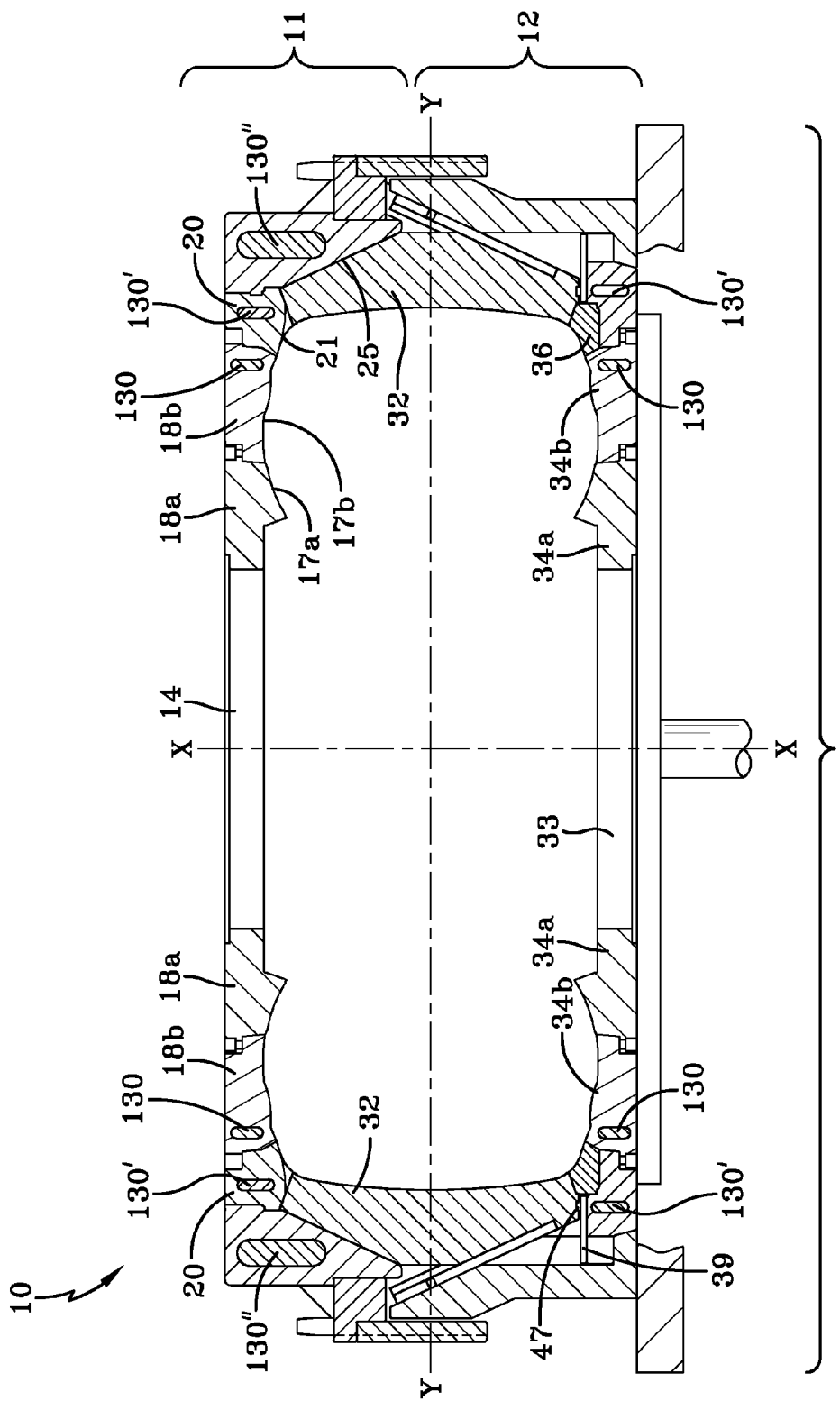
FIG. 3 is a cross-sectional side view of the tire mold of FIG. 1 shown without a tire therein.

FIG. 1 illustrates a cross-sectional side view of an improved tire mold 10 of the present invention shown in the closed position, while FIG. 2 illustrates a tire mounted in a mold. The mold as shown has an upper portion 11 which includes a sidewall annular ring 18 having a central opening 14. The sidewall annular ring 18 may be further divided into two or more sidewall components 18a, 18b as shown, for ease of manufacturing. The sidewall components 18a, 18b each include an inner surface 17a, 17b for molding the sidewall of a tire. The sidewall annular ring or sidewall components 18a,18b further include an interior cavity 100 that preferably extends along the entire width of the sidewall annular ring or sidewall components 18a,18b. The cavity 100 is filled with an insulating material such as fiberglass, or a fiberglass reinforced, mineral filled sheet with heat resistant polyester thermosetting resin. One commercially available insulation suitable for use is sold under the tradenames GLASSTHERM HT, GLASTHERM CH or GLASTHERM S, and is made by Jaco Products of Middlefield, Ohio. The R value of the insulation may be adjusted to provide the desired temperature profile of the tread segments and the sidewall components in order to ensure that the sidewall and belt edges are not over cured.

The upper mold portion 11 further includes an optional annular shoulder ring 20. The optional shoulder ring 20 is located between the sidewall components 18a, 18b and an annular actuating ring 24. The shoulder ring has an inner molding surface 21 for molding the shoulder/tread area of the tire. The annular actuating ring 24 comprises an inner frustroconical surface 25 aligned for engagement with an outer frustroconical surface 31 of the tread segments, and functions to align the tread segments during closing of the mold.

Referring again to FIG. 1, a lower portion 12 of the mold 10 includes a lower sidewall ring 34 having a central opening 33. The lower sidewall ring may be further subdivided into two or more components 34a, 34b. The lower sidewall annular ring 34 or sidewall components 34a,34b further include an interior cavity 102 that preferably extends along the entire width of the sidewall annular ring or sidewall components 34a, 34b. The cavity 100 is filled with an insulating material such as fiberglass, or a fiberglass reinforced, mineral filled sheet with heat resistant polyester thermosetting resin. One commercially available insulation suitable for use is sold under the tradenames GLASSTHERM HT, GLASTHERM CH or GLASTHERM S, and is made by Jaco Products of Middlefield, Ohio.

An optional shoulder ring 36 is positioned radially outward of the sidewall ring. The optional shoulder ring has a tread forming surface 35 for forming the shoulder section of the tire.

The lower portion of the mold further comprises a plurality of tread segments 32, which are arranged circumferentially about the green tire to be molded. Each tread segment 32 has a tread molding surface 33 having for example, lands and grooves for molding the tread of a green tire. The tread segments join together to form an annular ring to encircle and mold a tread of a green tire. Preferably, each tread segment is formed of a one piece unit and is not split into two or more pieces. Thus each tread segment has a tread molding surface 33 which extends substantially unbroken across the outer tread surface of the green tire, from one shoulder to the opposite shoulder. Each tread segment 32 preferably further includes a cavity 110, 112 that is located at the axially outer ends 114,116 of the segment 32. The cavities 110,112 are preferably positioned near the tread surface 33 to be adjacent the belt edges of the tire.

Although the invention has been shown for use with a segmented type of mold, the invention is not limited to a segmented mold and may be utilized in other types of molds. Although the invention has been shown and described with respect to a certain preferred embodiment or embodiments, certain equivalent alterations and modifications will occur to others skilled in the art upon the reading and understanding of this specification and the annexed drawings.

What is claimed:

1. A tire mold comprising an upper mold portion and a lower mold portion, wherein the upper mold portion and the lower mold portion are movable relative to one another for insertion of a tire into the mold; wherein the upper mold portion includes an upper sidewall ring and the lower mold portion includes a lower sidewall ring; wherein the lower mold portion further includes a plurality of tread segments which are joinable together to form an annular ring to encircle a tread of a green tire; wherein the upper and lower sidewall ring each includes an internal cavity filled with insulating material.

2. The mold of claim 1 wherein the tread segments further comprise an internal cavity filled with insulating material.

3. The mold of claim 2 wherein the tread segments have axially outer ends, and the internal cavity filled with insulating material is located at each axially outer end.

4. The mold of claim 1 wherein the internal cavity of the upper and lower sidewall ring is positioned adjacent the inner surface of the sidewall ring.

5. The mold of claim 1 wherein the upper and lower sidewall ring is divided into two components.

6. The mold of claim 1 wherein the internal cavity of the upper and lower sidewall ring extends substantially along the inner surface of the sidewall ring.

7. The mold of claim 1 wherein the insulating material is fiberglass.

8. The mold of claim 1 wherein the insulating material is a fiberglass reinforced, mineral filled sheet.

* * * * *